US 6,621,060 B1

(12) United States Patent
Nantel et al.

(10) Patent No.: US 6,621,060 B1
(45) Date of Patent: Sep. 16, 2003

(54) AUTOFOCUS FEEDBACK POSITIONING SYSTEM FOR LASER PROCESSING

(75) Inventors: Marc Nantel, Oakville (CA); Dejan Grozdanovski, Toronto (CA)

(73) Assignee: Photonics Research Ontario, Toronto (CA)

( * ) Notice: Subject to any disclaimer, the term of this patent is extended or adjusted under 35 U.S.C. 154(b) by 0 days.

(21) Appl. No.: 10/108,990

(22) Filed: Mar. 29, 2002

(51) Int. Cl.⁷ .............................................. G02B 27/40
(52) U.S. Cl. ................................ 250/201.4; 250/201.8; 356/609; 356/631
(58) Field of Search .......................... 250/201.4, 201.3, 250/201.2, 201.8, 226, 559.27, 559.29, 559.31; 356/609, 623, 624, 625, 630, 631; 396/106, 431, 80; 347/246, 225

(56) References Cited

U.S. PATENT DOCUMENTS

| | | | |
|---|---|---|---|
| 4,798,948 A | | 1/1989 | Neumann et al. |
| 4,844,617 A | | 7/1989 | Kelderman et al. |
| 5,530,512 A | | 6/1996 | McIntyre |
| 5,696,589 A | * | 12/1997 | Bernacki .................... 356/630 |
| 5,703,351 A | | 12/1997 | Meyers |
| 5,764,272 A | | 6/1998 | Sarraf |
| 5,781,297 A | * | 7/1998 | Castore ...................... 356/486 |
| 5,781,303 A | * | 7/1998 | Berndt ........................ 356/632 |
| 5,825,023 A | | 10/1998 | Cai et al. |
| 6,303,903 B1 | | 10/2001 | Liu |

OTHER PUBLICATIONS

The Basics of Triangulation Sensors, http://www.sensorsmag.com/articles/0598/tri0598/main.shtml; pps 1–7; William P Kennedy, CyberOptics Corp.; Sensors –May 1998.*

Laser Triangulation Sensors, in the Tire Industry; http://www.sensorsmag.com/articles/0302/tire/main.shtml; pps 1–6; Mike Snow, LMI Selcom; Sensors —Mar. 2002.*

Taking the Pain out of Laser Triangulation; http://www.sensorsmag.com/articles/0702/laser/main.shtml; pps 1–6; Martin Dumberger, Micro–Epsilon America; Sensors —Jul. 2002.*

* cited by examiner

Primary Examiner—Kevin Pyo
Assistant Examiner—Seung C. Sohn
(74) Attorney, Agent, or Firm—Lynn C. Schumacher; Hill & Schumacher

(57) ABSTRACT

The present invention provides a laser processing and autofocusing system that measures the position of the workpiece at the machining spot, to allow the laser processing of work-pieces which are not flat and have surface variations, with the autofocusing system being able to compensate for these variations. During laser machining, it is desirable to keep the laser focus at the same height with respect to the surface of the sample for the best possible machining quality. Not all samples are flat, though, and it thus becomes necessary to map the surface of the sample accurately and to correct the focusing of the laser beam on the fly. The system includes a processing laser beam directed onto the surface at normal incidence and a light line projected onto the surface in the vicinity of the area being machined but at an angle with respect to the surface normal. The focusing optics for the machining laser and light line generator are fixed relative to each other on a positioning stage. If the work-piece surface deflects up or down, the light line moves correspondingly in the horizontal plane with respect to the laser focal spot. This change is monitored on the imaging system and the change of position is used to drive a controller. A proportional voltage set-point is produced by the electronics for feedback to the controller which uses this voltage reference to move the positioning stage to correct accordingly so the focal point of the processing laser beam is once again positioned at the surface of the work-piece.

32 Claims, 2 Drawing Sheets

AUTOFOCUS FEEDBACK POSITIONING SYSTEM FOR LASER PROCESSING

FIELD OF THE INVENTION

The present invention relates to an autofocus feedback method and system for laser processing of materials.

BACKGROUND OF THE INVENTION

Laser processing, such as micromachining, is a technique that offers precise, non-contact and accurate machining of very small components, and is an emerging advanced manufacturing technology that is being adapted to widely diverse industrial applications. Conventional mechanical machining can produce work-pieces and assemblies with typical feature sizes larger than a few hundred microns. However, the steadily increasing demand for smaller sizes requires new tools and processes, of which laser micromachining is one.

When laser processing or micromachining a work-piece, the beam from a laser is focused onto the work-piece with a lens assembly. Typically, it is at the focal point of the lens, where the laser beam is the smallest and hence the most concentrated, that the machining is meant to occur. The focus of the beam is usually where the laser is most efficient at cutting, drilling or otherwise modifying the work-piece. The laser beam is considered to be "at focus" over a working distance called the confocal parameter, or working focal range, which is the distance around the focus along the laser beam where the energy density of the laser beam is close to that at the focus, and therefore good enough to do the work and/or to achieve required machining properties. The distance between the lens and its focal point is fixed by the dimensions and specification of the lens, and is constant for any given lens and any given laser beam. During the machining process, the work-piece is moved under the fixed laser beam such that the features are machined according to the wanted design. Alternatively, the work-piece can be stationary but then the laser focus has to move. Of critical importance for the best possible machining parameters is to have the work-piece at a constant distance from the lens to keep its surface within the working focal range. In most cases, laser micromachining is performed on flat work-pieces. If the work-piece has deformations along the laser beam axis that are greater than the working focal range of the laser, these deformations will cause the laser to go out of focus on the work-piece, such that the laser will not properly machine in that area. Even though the work-piece is fastened to a holder or substrate, deformations due to the heat damage of the laser or preexisting deformations may result in that region of the work-piece being unmachinable. Similarly, it becomes difficult to machine work-pieces that have a curved surface by design. Sometimes, it is preferred to process the work-piece with the laser focus intentionally below or above the work-piece surface, but the problem of keeping the focus at a constant distance with respect to the work-piece surface remains the same.

During laser machining, it thus becomes necessary to map the surface of the sample accurately and to correct the focusing of the laser beam on the fly. There exist several commercially-available autofocusing systems for laser machining features on large work-pieces (on metal sheets, for example), where the depth of focus is usually long. These typically are based on capacitance sensing, on lasers, on ultrasound ranging or even on touch. None of these are best suited for the breadth of applications typical of laser micromachining, which often involve very short depth of focus, and fragile, often non-metallic materials.

Capacitive sensors use changes in the electric field caused by a change in the relative dielectric coefficient of the material being sensed. The amount of material in close proximity to the sensor dictates the dielectric coefficient, as compared to air, which has a dielectric coefficient close to that of free space. While these sensors are capable of high reproducibility, they only work for metallic work-pieces, the sensing distance is very limited, and its function is usually limited to a proximity switch. In addition, capacitive sensors are not adequate for use in high-precision applications because the sensing region or spot may be large, of the order of centimeters.

Ultrasonic sensors work on ultrasonic waves being reflected from the surface of the work-piece and are not material dependent. A drawback to these types of sensors is they suffer from low precision (a resolution of 200 $\mu$m), and require near vertical positioning.

Fiber-optic lever-displacement transducers use two optical fibers, one to emit light and the other to receive light. The light intensity detected by the receiver increases with distance from the surface at first as the reflected amount increases (from a geometrical consideration having to do with the positions of the two fibers), but then decreases after a certain point (due to a distance-squared intensity drop-off relationship). These transducers offer very high resolution, but are very expensive, and may be sensitive to the plasma flame produced by the laser-matter interaction causing interference thus necessitating a protective shroud. In addition, incorrect readings can be obtained if the work-piece is not very smooth.

Laser sensors emit a light beam from a laser diode which strikes the object's surface reflecting a small spot onto a position-sensitive detector. Signal processing electronics translate the detector output into a voltage proportional to displacement. While laser sensors have a very high resolution of 10 $\mu$m, and a visible beam for easy alignment, the use of a highly-specialized position-sensitive detector makes them somewhat expensive. Also, if the small laser diode spot falls in a precut hole, the measurement is rendered completely unusable.

Contact sensors are mechanical in nature, and usually consist of a switch, potentiometer or transducer detection of change in magnetic field (primary winding and two secondary windings). The resolution is essentially infinite, these sensors are simple and relatively inexpensive, and they are not dependent on the surface being cut. On the other hand, these types of sensors are problematic in that they may damage the cutting surface since they are in physical contact. In many laser-processing applications, it is necessary to have a non-contact sensor since the material may be very delicate and require high accuracy because the consistency of the cut is very sensitive.

In addition to their particular limitations, all the above sensors suffer from geometrical limitations. Most involve positioning a piece of equipment (a capacitance sensor, an ultrasound system, a fiber assembly or a contact sensor) at the measurement site. By finding the work-piece position at a spot more or less near the machining spot, these methods are adequate to the general laser machining of large features with limited precision. But since laser micromachining concerns itself with micron-precision resolutions, it requires an autofocus system that measures the work-piece surface position at the very machining spot while not being sensitive to precut features in the work-piece. Due to the close proximity of the focusing lens and gas assist nozzle to the work-piece, this is not usually possible with the currently available methods mentioned above.

It would be very advantageous to provide an autofocusing system that will measure the position of the work-piece at the machining spot relative to the focal spot of the machining laser and provide constant adjustment to maintain the focal spot either at the surface of the work-piece or, in the case where a specific and constant vertical offset of the focal point from the surface is desired when working "off-focus", it would be advantageous for such a system to be able to hold the focal point at a pre-programmed distance from the surface of the work-piece. Such a system would allow the laser micromachining of work-pieces which are not flat and have surface variations, or develop surface variations during machining, with the autofocusing system being able to compensate for these variations.

SUMMARY OF THE INVENTION

The present invention provides an autofocusing system, for use in combination with a laser processing system, that measures the position of the surface of a work-piece being laser processed at the machining spot relative to the focal spot of the processing laser, and provides constant adjustment to maintain the focal spot either at the surface of the work-piece or at a specific offset from the surface. An advantage of the present autofocusing system is that it allows the laser processing of work-pieces which are not flat and have surface variations, or develop surface variations during machining, with the autofocusing system being able to compensate for these variations.

In one aspect of the invention there is provided an autofocus feedback system for a laser processing system, comprising:

a focusing and directing system disposed to receive a first laser beam for processing a work-piece and focus and direct said first laser beam onto a surface of the work-piece, an actuator connected to said focusing and directing system for controlling movement of the focusing and directing system for adjusting where the focused laser beam hits on the surface of the work-piece and for controlling a distance of a focal spot of said laser beam from the surface;

a light source and a light shaping and projecting system disposed to receive light from said light source and project a selected patterned beam of light onto a surface of said workpiece in a region of the surface being processed with said first laser beam, said light shaping and projecting system producing a light pattern including an elongate portion, said focusing and directing system and said light shaping and projecting system being disposed with respect to each other so that the focused first laser beam incident on the surface and the patterned beam of light incident on the surface are at a pre-selected angle with respect to each other;

image detection means for receiving an image of said patterned beam of light reflected from said surface; and processing means for calculating a shift in position of said surface in a vicinity of the region of the surface being laser processed from said image of said patterned beam of light reflected from said surface, said processing means being connected to said actuator so that as the position of said surface shifts, said actuator moves said directing and focusing system to return said focal spot to a pre-selected distance from said surface.

In another aspect of the invention there is provided a laser processing system with autofocus feedback, comprising:

a first laser for processing a work-piece, a focusing and directing system disposed to receive a first laser beam from said first laser and focus and direct said first laser beam onto a surface of the work-piece, an actuator connected to said focusing and directing system for controlling movement of the focusing and directing system for adjusting where the focused laser beam hits on the surface of the work-piece and for controlling a distance of a focal spot of said laser beam from the surface;

a light source and a light shaping and projecting system disposed to receive light from said light source and project a selected patterned beam of light onto a surface of said work-piece in a region of the surface being processed with said first laser beam, said light shaping and projecting system producing a light pattern including an elongate portion, said focusing and directing system and said light shaping and projecting system being disposed with respect to each other so that the focused first laser beam incident on the surface and the patterned beam of light incident on the surface are at a pre-selected angle with respect to each other;

image detection means for receiving an image of said patterned beam of light reflected from said surface; and processing means for calculating a shift in position of said surface in a vicinity of the region of the surface being laser processed from said image of said patterned beam of light reflected from said surface, said processing means being connected to said actuator so that as the position of said surface shifts, said actuator moves said directing and focusing system to return said focal spot to a pre-selected distance from said surface.

The present invention also provides a method for autofocus feedback for maintaining a focal spot of a processing laser at a pre-selected distance from a surface of a work-piece being laser processed, said pre-selected distance including said focal spot being coincident with said surface or at a specified distance from said surface, the method comprising the steps of:

focusing a processing laser beam to a focal spot and directing said focused processing laser beam onto a surface of a work-piece, projecting a patterned beam of light onto a surface of said work-piece in a region of the surface being processed at a pre-selected angle with respect to said focused processing laser beam incident on the surface, said patterned light beam including an elongate portion; and capturing an image of the patterned light beam reflected from the surface and calculating a shift in position of said surface in a vicinity of the region of the surface being laser processed from said image of said patterned beam of light reflected from said surface and if said surface has shifted adjusting said focused processing laser beam to return said focal spot to said pre-selected distance from said surface.

BRIEF DESCRIPTION OF THE DRAWNGS

The invention will now be described, by way of non-limiting examples only, reference being had to the accompanying drawings, in which.

Figure 2:
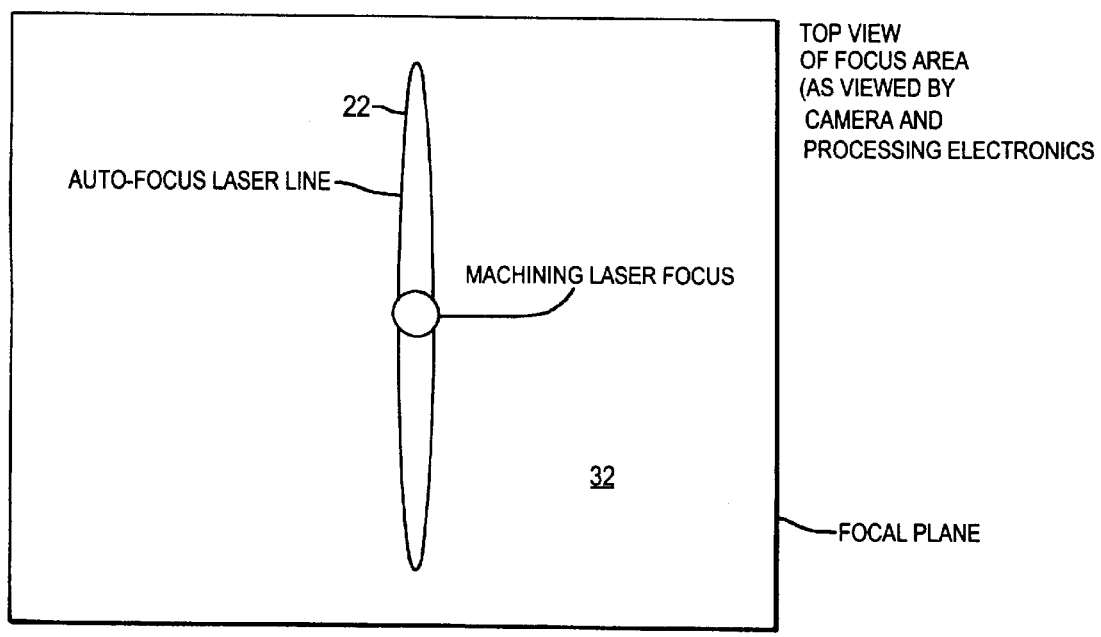
FIG. 2 is a top view of the surface of the workpiece and focal spot of the micromachining laser incident on the surface as viewed along the axis of the micromachining laser beam with the top surface of the workpiece located in the focal plane of the laser so the light line on the surface intersects the laser focal point.
Figure 3:
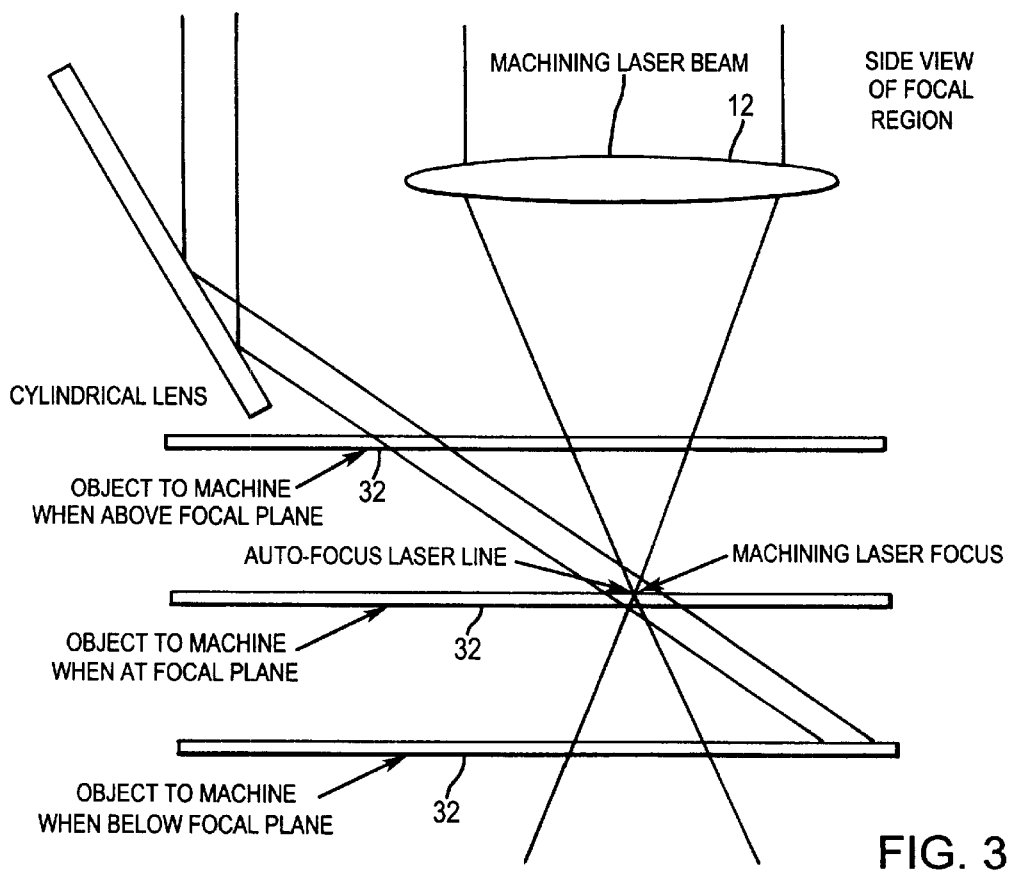
Figure 4:
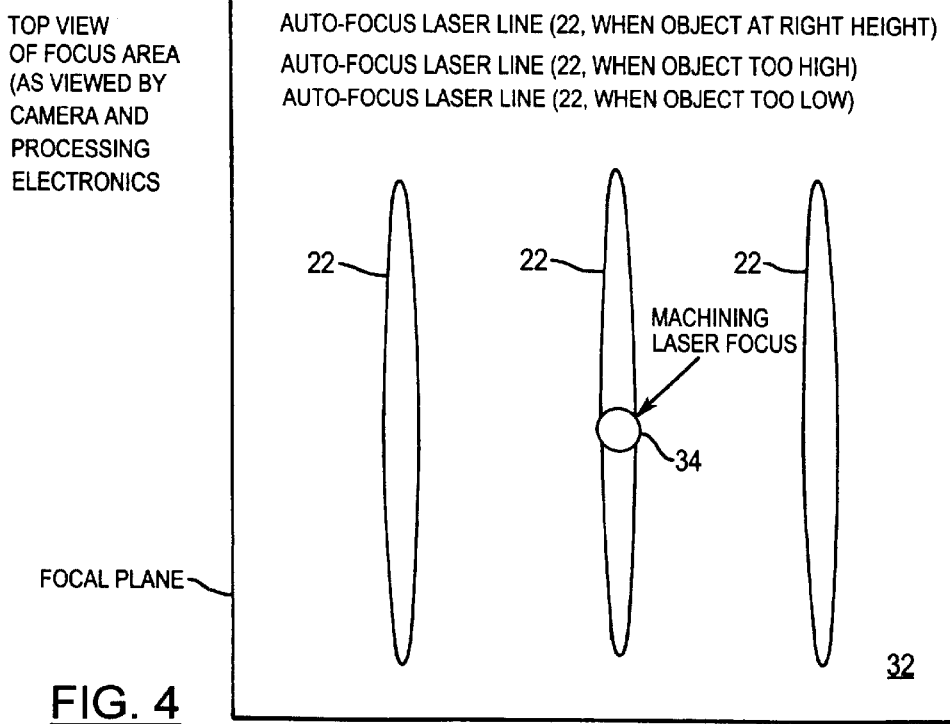

FIG. 3 is a view of the relationship between the machining laser, workpiece surface at the focal point of the machining laser and light line showing how a vertical change in the workpiece surface in the vicinity of the laser spot size is translated into horizontal deflections in the light line; and FIG. 4 is a top view similar to FIG. 2 but showing the effect on the light line projected onto the surface of the workpiece when the surface undergoes movement up and down relative to the focal plane of the micromachining laser as shown in FIG. 3.

DETAILED DESCRIPTION OF THE INVENTION

Figure 1:
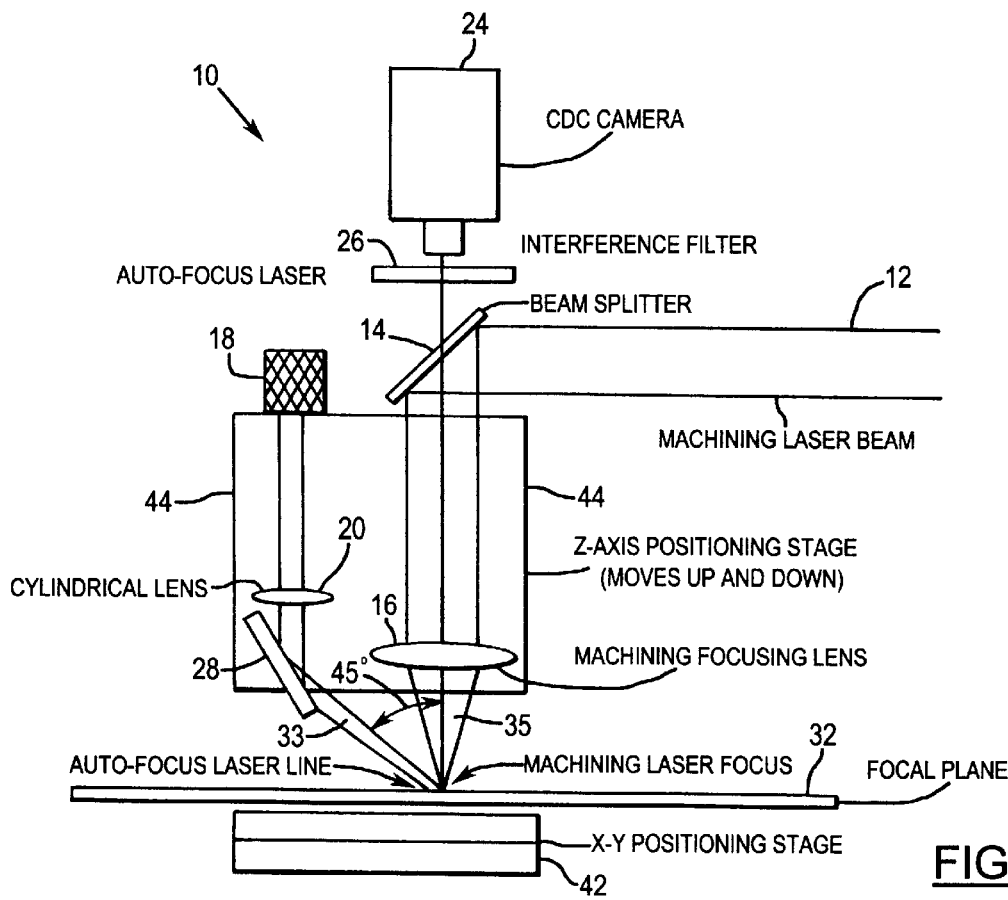
FIG. 1 is a block diagram of an autofocus feedback system for laser micromachining constructed in accordance with the present invention.

Referring to FIGS. 1 and 2, a block diagram of a combined laser processing and autofocusing system is shown generally at 10. The laser processing system uses a processing laser beam 12 for processing the work-piece. A common type of laser processing involves laser machining or micromachining of a material. A beam splitter 14 is used to direct laser beam 12 onto the focusing optical component, shown as a focusing lens 16, which focuses the laser beam 12 down to the desired spot size on the work-piece which is positioned with its surface at the focal plane 32, and which is moved around in the horizontal plane using an X-Y positioning stage 42. It is noted that the focal spot of the focussed laser beam refers to the spot seen at the theoretical focal point of the lens.

The apparatus includes a light line projector including a light source 18 and associated optics, including a cylindrical lens 20 and mirror 28 for projecting a line of light 22 (which may have a wavelength in the red or other wavelengths) at a selected angle from the vertical with respect to the surface of the work-piece. This angle shown in FIG. 1 is 45° which is a preferred angle but those skilled in the art will appreciate that other angles may be used as well. Both the focusing lens 16 and the light line projector are fixed to a Z positioning stage 44 which moves both of them together up and down in the vertical direction. An actuator (not shown) is used to move the positioning stage 44 to re-position the focal spot of the processing laser beam at the desired position relative to the surface of the work-piece. Positioning stage 44 may include an adjustment mechanism (not shown) for adjusting the angle between the portion of patterned beam of light incident on the surface (beam portion 33 in FIG. 1) and the portion of focused processing laser beam incident on the surface (beam portion 35 in FIG. 1).

Any imaging detector, including but not limited for example to a charge coupled device (CCD) camera 24 such as shown in FIG. 1, is positioned to capture an image of the light line 22. Camera 24 has a filter 26 mounted in front of it in order to filter out the wavelengths of the machining laser beam 12 and those emitted by the plasma produced by the laser/material interaction, but not the wavelength of light line 22. Camera 24, which is shown operating through the focusing optics of the machining laser beam 12, is used to monitor the motion of the light line 22 with respect to its field of view. Associated electronics separates the video signal into usable components so that the position of the line 22 can be determined. The output of camera 24 can be shown on a video screen for ease of alignment by the operator. The light line 22 is fixed in a known position with respect to the machining laser beam 12 focal spot hitting the surface 32 so that when the work-piece surface is in the focal plane 32, this light-line/focal-spot configuration defines a calibration.

Using a pattern of light such as a long thin line of light rather than a point of light is the best mode of performing the present method and solves a major problem associated with autofocus systems based on reflection of points of light. Particularly, it is important that the light pattern not be a point of light in order to avoid the loss of a reflected light signal when the autofocus beam hits a precut feature such as a hole or slot. If a point of light is used and it falls into a hole already present in the work-piece, there will be little or no reflection from the work-piece and no light is detected at the detector which means the detector has no input from which to calculate the position correction for the processing laser beam. Another advantage of a long thin line of light is the fact that it is thin in one direction (width) which increases the resolution in that direction but long in the other direction to avoid completely disappearing into a hole as mentioned above. As long as the light pattern is elongate in one direction to avoid completely disappearing into precut features as discussed above, the light line does not necessarily have to be a perfect or simple straight line.

For generating a light line 22, the light line generator may comprise a laser (e.g. a Diode-Pumped Solid-State, Heliumneon or diode laser) as light source 18 and associated optics to produce a light line of desired length (usually a combination of spherical and cylindrical optics). Different lasers may be used to generate lines of different color or wavelength as different materials reflect differently. The important feature is that the CCD camera 24 can detect the light line 22 reflected off the work-piece near the point where the processing laser beam 12 contacts the work-piece to define the position of the light line in the field of view of the camera 24. The Camera 24 is rotated so that the orientation of the camera matches the orientation of the line 22 generated by the diode laser and optics comprising the light line projector.

While a laser is a preferred light source for generating the light line, it will be appreciated that other light sources may be used. A non-coherent light source may be used with a color filter and a line-shaped aperture to generate the light line. The main point is that the detection system be able to detect the reflected light line and use it to determine the position of the work-piece. An advantage of using a laser to generate the light line is that it will have better defined edges.

Referring to FIGS. 1 and 3, the autofocusing system functions by imaging laser line 22 which is projected down at an angle (45°, for example, or 30° for increased sensitivity) relative to the processing laser beam onto the work-piece surface which is being machined. While 45° is shown as the pre-selected angle it will be understood that increased resolution may be obtained using a much smaller angle, for example 10° from horizontal (so that it is almost grazing) may be used if a sufficiently thin line could be generated that did not spread appreciably.

In one embodiment of the apparatus, camera 24 is a Pulnix TM-200 CCD camera with two TV 2× expanders connected in series with a telephoto lens. The Pulnix imager is a ½" interline transfer CCD with 768 (H)×494 (V) pixels and a cell size of 8.4 $\mu$m×9.8 $\mu$m. The Tamron telephoto lens features a manually adjustable focal range from 60 to 300 mm.

Referring to FIGS. 3 and 4, if the work-piece surface deflects up or down, the light line 22 moves correspondingly with respect to the laser focal spot. This is because while the point of intersection between the processing laser beam 12 on the work-piece surface is unchanged due to the vertical (perpendicular) incidence of the laser beam 12 on the surface, the position of the light line 22 does change due to its 45-degree angle of incidence on the work-piece. For example, as the surface 32 of the work-piece in the vicinity of the laser spot 34 deforms up and down, the light line 22 undergoes horizontal deflections with the amount of horizontal deflection being proportional to the vertical change in the surface of the work-piece. This change can be monitored on the imaging system on screen and processed by the autofocusing electronics. A proportional voltage set-point is produced by the electronics for feedback to a controller which uses this voltage reference to move the Z positioning stage 44 to correct accordingly so the surface of the work-piece is once again positioned at the focal point of the processing laser beam 12. Specifically, as the positioning stage 44 moves in such a way that the light line 22 returns to its original position in the field of view of camera 24 towards the calibration position, the laser focal spot is also moved to its preset distance from the surface which is either at the surface or offset from the surface. The result is a return to the optimal machining conditions defined by the calibration. This adjustment is conducted in real time, while the laser is cutting and the work-piece is moving, ensuring optimal machining condition at all time during the processing of the work-piece.

The desired position of the focal spot of the laser beam either at the surface of the work-piece or at a selected distance above it is selected by the user and may be pre-programmed. In many laser machining applications it is preferred to direct a fixed amount of laser energy into the material being processed, and in many situations this means concentrating the maximum amount of energy at the surface of the work-piece so that it is preferred to maintain the focal point of the focussed laser beam at the surface of the work-piece. However it will be appreciated that the present autofocussing method is not limited to maintaining the focal point per se at the surface but rather on keeping a fixed distance between the focal spot and the work-piece such that the laser fluence at the surface is constant, which may also be achieved using an out of focus setting in which the distance between the lens 16 and surface of the work-piece is not equal to the focal length so some other part of the focussed laser beam hits the surface rather than having the focal point right at the surface. Thus the present autofocus system provides constant fluence to the surface of the work-piece and keeps it constant by use of the autofocus system. It is typical for the processing laser to be oriented to be normal to the surface to be machined, particularly when the features being machined into the work-piece are to have walls perpendicular to the surface of the work-piece. However, it is sometimes desirable to have features such as holes that have walls which are not perpendicular with respect to the surface of the work-piece, in which case one would like to have the laser beam hitting the work-piece surface at the corresponding angle. This is often the case for example when cooling holes are drilled in turbine blades. Thus while the drawings show the processing laser at normal incidence to the surface of the work-piece which is the preferred orientation for use with the present autofocusing method, it will be understood that the machining beam does not have to be restricted to being normal to the work-piece surface as long as there is a known pre-selected angle between the processing laser beam and the autofocus light-line incident the surface. Thus the method is preferably implemented with the processing laser normal to the surface and the light line in line with the machining laser spot on the surface as shown in FIG. 2.

One non-limiting example of a processing laser is a Q-switched, diode pumped Nd:YLF running at 10 kHz with 80-ns pulses. This laser produces a beam that has a wavelength of 1,053 nm. The laser is always "on," and operates in conjunction with a mechanical "shutter" that either allows or doesn't allow the laser beam to pass through it.

In the embodiment of the autofocusing system in FIGS. 1, 2, 3, and 4, the light line 22 generated by the laser diode is a collimated rectangular beam approximately 1.6 mm×8 mm. This beam is focused through a cylindrical lens with a focal length of 150 mm. The mirror 22 attached to the Z-axis is used to reflect the beam at the 45-degree angle with respect to the focussed processing laser beam 12 which in this case is coming in normal to the surface.

Since the image of the reflected light line from the surface of the machined work-piece uses the same optical path as the machining laser, and because the plasma flame generated by the YLF processing laser emits light of a diffuse nature which is very intense and crosses many different wavelengths, including that of the laser diode, the bandpass filter 26 is necessary to pass light of wavelength corresponding to the light line but filter out all other wavelengths.

It will be understood that while the system shown in FIG. 1 shows the reflected light line imaged by the CCD camera 24 and the processing laser beam 12 normal to the surface being coaxial along the normal to the surface, which necessitates the need for interference filter 26, it will be appreciated that other optical configurations may be used. One such other configuration could involve having the machining laser focus and the light line hit the work-piece in different areas for the calibration, such that the CCD camera 24 would not include the bright plasma in its field of view. While this might enable the user to do away with the interference filter 26, it would also make the machining spot and diagnostic spot be in two different areas, thereby reducing the effectiveness of the technique. Another way to do without the filter would be to use software processing of the CCD camera 24 image to exclude the bright spot created by the emitting plasma from the processing when determining the position of the reflected light line. Generally, though, since the area being detected by the CCD camera 24 usually includes the machining laser plasma, some type of filter (optical, configurational, software or other) will be needed to ensure a well-working autofocus system.

The electronics associated with the autofocusing system is used to determine where on the video signal the image of the light line is located. It is with this information that the feedback voltage sent to the Z-axis controller is generated. The digital part of the circuit is used to determine whether the video signal from the camera is in the upper half or the lower half of the video raster or any predefined position on the screen (video raster). The horizontal and vertical synchronization timing information is detected from the video signal or from the sync generator and fed to the system and the camera. The content of the video signal is fed into the processing electronics and if laser beam falls in the upper portion of the split screen, the electronic circuit produces positive 10 volts, while if the laser beam falls in the lower part of the split screen, the electronic circuit will produce a −10 volt signal. Being exactly on the split line will generate a 0 volt signal.

Therefore, slight movement will generate anything between −10 and +10volts regarding position of laser line on the screen. The outputs of the digital part of the circuitry are connected to the analog part of the circuit, which is used to generate a signal of −10 to +10 volts proportional to the departure of the light line video position from the calibration position. Resistor-capacitor (RC) elements in the amplification stages are used to smooth out the signal to provide a DC voltage for the analog to digital converter in the Aerotech Z positioning stage controller.

A potentiometer in the analog circuitry provides a DC offset so the zero voltage point can be adjusted with the potentiometer. This is necessary to precisely position the light line on the screen for calibration. The circuit may be powered by a Xantrex power supply that is capable of providing the required +10 V, −10 V, ground, and +5 V for the circuitry. Recently autofocusing system has been tested with software signal processing using DVT Legend 530 intelligent camera. The camera provides digital outputs: in position, out of position (+), out of position (−) and out of range This system has been tested using a 6K controller from Parker-Compumotor, using jog inputs and high-speed jog. No additional software has been provided for the 6K controller.

The present autofocusing system may be adapted or retrofitted to current laser machining facilities, regardless of laser power or size of machining piece.

A non-limiting, example of software control of the apparatus comprises an Aerotech Unidex 600 MMI software 600.06.00.106, which has a command called AFCO which allows the user to configure the input of the Aerotech XYZ-stage controller DR 500 as an autofocus single axis control input on the Z positioning stage. Parameters which can be set by the AFCO command are:

Axis—the axis which tracks the analog input
ADC channel—analog input channel (0–7)
Speed—speed of the axis when the difference between the current analog input and the analog set-point is 10 volts
Dead-band—Minimum deviation from the analog set-point for motion to occur
Analog set-point—desired analog target value, range +/−10 volts
Anti-dive—value of the analog input beyond which no motion will occur, range +/−10 volts The AFCO command works by converting the voltage difference from the set-point to a speed which is proportional to the voltage displacement.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An autofocus feedback system for a laser processing system, comprising:
    a focusing and directing system disposed to receive a first laser beam for processing a work-piece and focus and direct said first laser beam onto a surface of the work-piece, an actuator connected to said focusing and directing system for controlling movement of the focusing and directing system for adjusting where the focused laser beam hits on the surface of the work-piece and for controlling a distance of a focal spot of said laser beam from the surface;
    a light source and a light shaping and projecting system disposed to receive light from said light source and project a selected patterned beam of light onto a surface of said workpiece in a region of the surface being processed with said first laser beam, said light shaping and projecting system producing a light pattern including an elongate portion, said focusing and directing system and said light shaping and projecting system being disposed with respect to each other so that the focused first laser beam incident on the surface and the patterned beam of light incident on the surface are at a pre-selected angle with respect to each other;
    image detection means for receiving an image of said patterned beam of light reflected from said surface; and
    processing means for calculating a shift in position of said surface in a vicinity of the region of the surface being laser processed from said image of said patterned beam of light reflected from said surface, said processing means being connected to said actuator so that as the position of said surface shifts, said actuator moves said directing and focusing system to return said focal spot to a pre-selected distance from said surface.

2. The autofocus system according to claim 1 wherein said directing and focusing system directs said focused beam onto the surface at a direction which is substantially normal to the surface of the work-piece.

3. The autofocus system according to claim 1 wherein said pre-selected distance of the focal spot from the surface is zero so that said focal point is coincident with said surface.

4. The autofocus system according to claim 1 wherein said image detection means is connected to an image display means for displaying an image of said pattern of light reflected from said surface.

5. The autofocus system according to claim 1 wherein said pattern of light produced by said light shaping and projecting system is a straight light line.

6. The autofocus system according to claim 5 wherein said directing and focusing system and said light shaping and projecting system are disposed with respect to each other so that said light line is projected onto said surface in such a way as to intersect a region where said laser beam strikes the surface of the work-piece.

7. The autofocus system according to claim 1 wherein said light source is a second laser emitting a laser beam having a wavelength different from said laser beam produced by said first laser.

8. The autofocus system according to claim 1 including filter means located in front of said detection means for filtering light entering said detection means to pass light of wavelengths corresponding to said reflected pattern of line.

9. The autofocus system according to claim 1 wherein said detection means is an imaging detector.

10. The autofocus system according to claim 9 wherein said imaging detector is a CCD camera.

11. The autofocus system according to claim 7 wherein said second laser is a helium neon laser beam emitting at a wavelength in the red.

12. The autofocus system according to claim 7 wherein said second laser is a diode laser.

13. The autofocus system according to claims 1 wherein said pre-selected angle is between about 25 to 75 degrees from a centerline of said machining laser beam.

14. The autofocus system according to claim 8 wherein said filter means is a bandpass filter which passes light having a wavelength corresponding to said light source.

15. The autofocus system according to claim 1 wherein said focusing and directing system and said light source and said light shaping and projecting system are mounted on a positioning stage with the positioning stage disposed so said focusing and directing system receives said machining laser beam and focuses and directs it to said work-piece, and wherein said actuator is connected to said positioning stage.

16. The autofocus system according to claim 15 wherein said positioning stage includes adjustment means for adjusting the angle between the patterned beam of light incident on the surface and the machining laser incident on the surface.

17. A laser processing system with autofocus feedback, comprising:

a first laser for processing a work-piece, a focusing and directing system disposed to receive a first laser beam from said first laser and focus and direct said first laser beam onto a surface of the work-piece, an actuator connected to said focusing and directing system for controlling movement of the focusing and directing system for adjusting where the focused laser beam hits on the surface of the work-piece and for controlling a distance of a focal spot of said laser beam from the surface;

a light source and a light shaping and projecting system disposed to receive light from said light source and project a selected patterned beam of light onto a surface of said work-piece in a region of the surface being processed with said first laser beam, said light shaping and projecting system producing a light pattern including an elongate portion, said focusing and directing system and said light shaping and projecting system being disposed with respect to each other so that the focused first laser beam incident on the surface and the patterned beam of light incident on the surface are at a pre-selected angle with respect to each other;

image detection means for receiving an image of said patterned beam of light reflected from said surface; and processing means for calculating a shift in position of said surface in a vicinity of the region of the surface being laser processed from said image of said patterned beam of light reflected from said surface, said processing means being connected to said actuator so that as the position of said surface shifts, said actuator moves said directing and focusing system to return said focal spot to a pre-selected distance from said surface.

18. The system according to claim 17 wherein said directing and focusing system directs said focused beam onto the surface at a direction which is substantially normal to the surface of the work-piece.

19. The system according to claim 18 wherein said pre-selected distance of the focal spot from the surface is zero so that said focal point is coincident with said surface.

20. The system according to claim 18 wherein said image detection means is connected to an image display means for visually displaying an image of said pattern of light reflected from said surface.

21. The system according to claim 18 wherein said pattern of light produced by said light shaping and projecting system is a straight light line.

22. The system according to claim 21 wherein said directing and focusing system and said light shaping and projecting system are disposed with respect to each other so that said light line is projected onto said surface in such a way as to intersect a region where said laser beam strikes the surface of the work-piece.

23. The system according to claim 18 wherein said light source is a second laser emitting a laser beam having a wavelength different from said laser beam produced by said first laser.

24. The system according to claim 18 including filter means located in front of said detection means for filtering light entering said detection means to pass light of wavelengths corresponding to said reflected pattern of line.

25. The system according to claim 18 wherein said detection means is an imaging detector.

26. The system according to claim 25 wherein said imaging detector is a CCD camera.

27. The system according to claim 18 wherein said second laser is a helium neon laser beam emitting at a wavelength in the red.

28. The system according to claim 17 including an X-Y translation stage wherein said work-piece is secured to said X-Y translation stage while being laser processed.

29. A method for autofocus feedback for maintaining a focal spot of a processing laser at a pre-selected distance from a surface of a work-piece being laser processed, said pre-selected distance including said focal spot being coincident with said surface or at a specified distance from said surface, the method comprising the steps of:

focusing a processing laser beam to a focal spot and directing said focused processing laser beam onto a surface of a work-piece, projecting a patterned beam of light onto a surface of said work-piece in a region of the surface being processed at a pre-selected angle with respect to said focused processing laser beam incident on the surface, said patterned light beam including an elongate portion; and capturing an image of the patterned light beam reflected from the surface and calculating a shift in position of said surface in a vicinity of the region of the surface being laser processed from said image of said patterned beam of light reflected from said surface and if said surface has shifted adjusting said focused processing laser beam to return said focal spot to said pre-selected distance from said surface.

30. The method according to claim 29 wherein said patterned light beam is a straight light line.

31. The method according to claim 29 wherein said focused processing laser beam is directed onto the surface of the work-piece at normal incidence to said surface.

32. The method according to claim 29 wherein if said surface has shifted said captured reflected patterned light beam shifts and said step of adjusting said focused processing laser beam to return said focal spot to said pre-selected distance from said surface includes producing a signal proportional to a distance said patterned light beam has shifted and using said signal as a feedback signal to drive a positioning means on which is mounted a processing laser focusing and directing system to re-position said focal point of said processing laser beam back to said pre-selected distance from said surface of the work-piece.

* * * * *